United States Patent [19]
Wood et al.

[11] Patent Number: 4,730,911
[45] Date of Patent: Mar. 15, 1988

[54] WIDE ANGLE OPTICAL VIEWER

[76] Inventors: Stephen C. Wood, 303 Laurel, Friendswood, Tex. 77546; Paul F. Thompson, Friendswood, Tex.

[21] Appl. No.: 822,747

[22] Filed: Jan. 27, 1986

[51] Int. Cl.$^4$ ............... G02B 7/00; G02B 5/00; G02B 23/00; F21V 9/06
[52] U.S. Cl. ............... 350/575; 350/1.2; 350/1.4; 350/319; 350/453; 350/501
[58] Field of Search ............... 350/1.2, 1.4, 319, 453, 350/501, 506, 537, 574, 575

[56] References Cited
U.S. PATENT DOCUMENTS

| | | | |
|---|---|---|---|
| 1,317,749 | 10/1919 | Aldis | 350/589 |
| 1,896,830 | 2/1933 | Scharff | |
| 1,971,066 | 8/1934 | Eppenstein | 350/537 |
| 2,312,542 | 3/1943 | Goodman | 88/1 |
| 2,491,758 | 12/1949 | Nichols et al. | 88/1 |
| 2,603,128 | 7/1952 | Miles | 88/57 |
| 3,229,577 | 1/1966 | Ellinger | 350/506 |
| 3,439,971 | 4/1969 | Van Vliet, Jr. | 350/45 |
| 3,472,577 | 10/1969 | Rosin et al. | 350/189 |
| 3,490,421 | 1/1970 | Pincus | 122/235 |
| 3,514,186 | 5/1970 | Poncelet | 350/176 |
| 3,514,188 | 5/1980 | Blosse et al. | 350/453 |
| 4,251,127 | 2/1981 | Yamaguchi | 350/69 |

*Primary Examiner*—Bruce Y. Arnold
*Assistant Examiner*—Vincent J. Lemmo
*Attorney, Agent, or Firm*—Marsteller & Assoc.

[57] ABSTRACT

This invention relates to a wide angle viewing system (V) which may be inserted into a high temperature environment, in particular, a furnace or burner (F). The superior interior wide angle view (A) yields pertinent information for use in diagnosing combustion problems. The access to the interior from the outside is variable from one furnace or burner to another. The viewer, therfore, was designed so that the wide angle view is retained regardless of the distance (D) the observer (O) must be from the outside to the interior. The wide angle viewer is simply affixed to the end of a pipe or tube (24) of sufficient length to reach to the interior (26), and then inserted into the interior (26) where the observer (O) looks into the rear end (24r) of the pipe to view the interior (26). Photographic equipment may also be installed at the rear end of the tube to provide a pictorial documentation of the interior (26). The wide angle viewer is constructed of inexpensive, readily available materials and this unique device offers the following advantages over any other available device:
Designed to withstand 1500° F. (1000° F. continuous).
Provides a very wide angle (100°), distortion free, exceptionally sharp view, with all distances in focus.
Lightweight and portable.
Parts are easily replaceable.
No cooling air or water is needed, thereby, minimizing plant construction or maintenance requirements.

4 Claims, 4 Drawing Figures

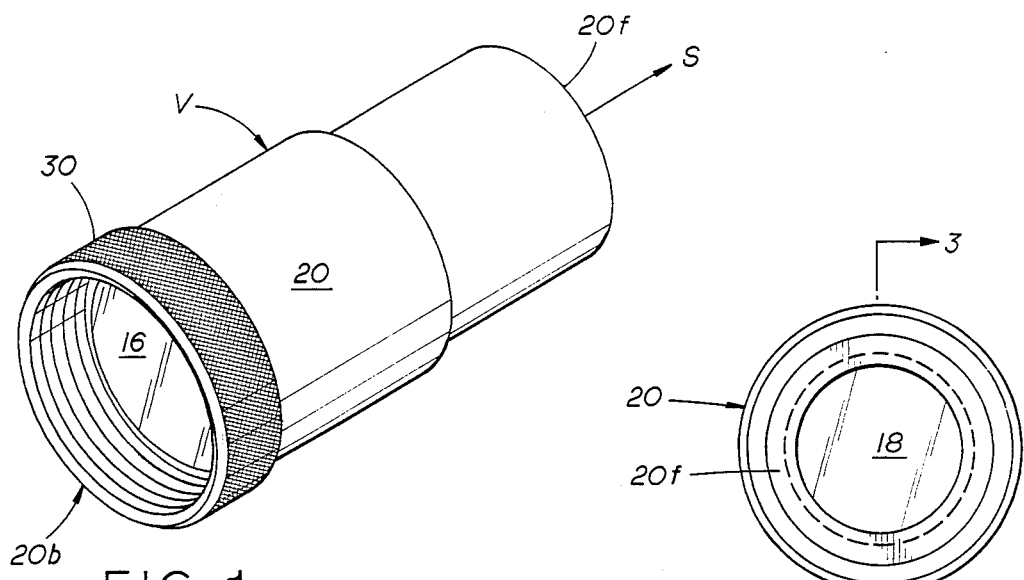
FIG. 1
FIG. 2
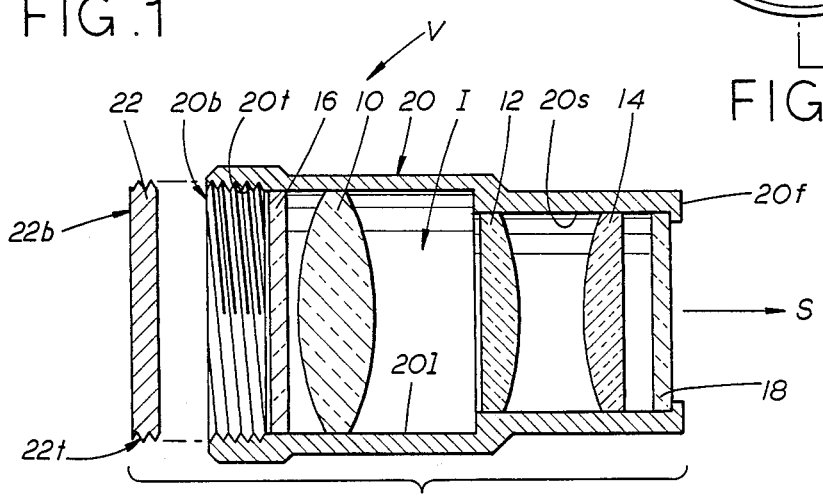
FIG. 3
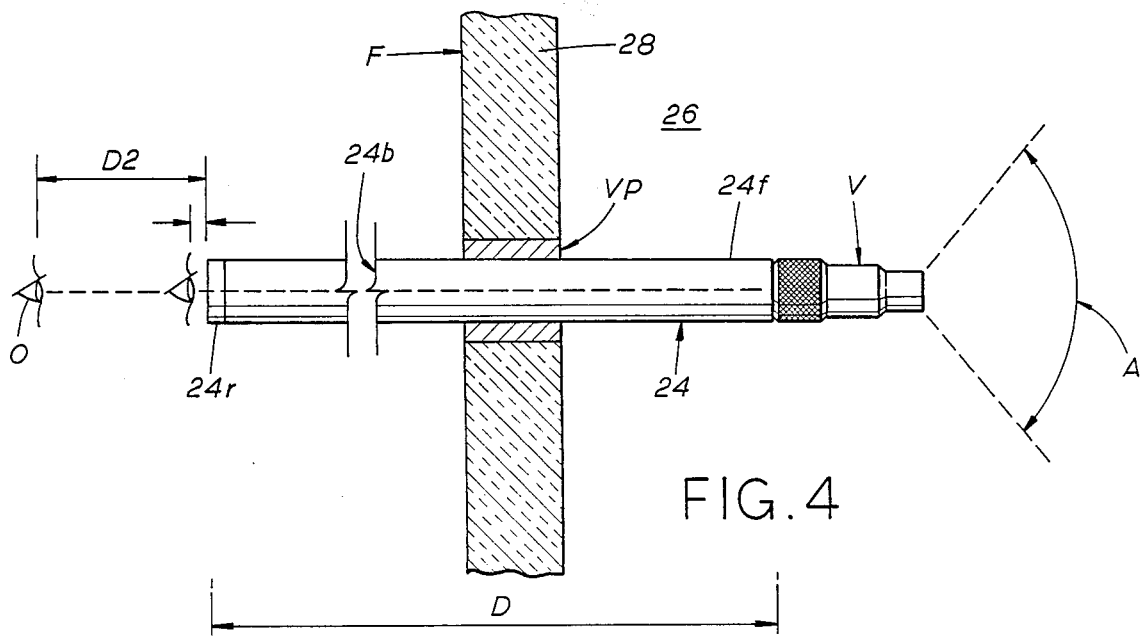
FIG. 4

WIDE ANGLE OPTICAL VIEWER

BACKGROUND OF THE INVENTION

1. Field of the Invention

This invention relates broadly to wide angle lens systems, and particularly to wide angle lens systems comprising two, identical, plano-convex optical lenses, positioned with convex surfaces facing each other, and a bi-convex optical lens having a diameter which is larger than the diameter of the preceding two lenses.

2. Description of Related Art

One of the most primitive devices for viewing the interior of a furnace is an access door. The view is very limited and plant operators' conclusions regarding the combustion process are very qualitative and subjective. As a result, the evaluation is inconsistent among operators. This inconsistency has led to the emergence of the optical viewer.

The previous optical viewers have required that one be positioned directly behind the viewer in order to view a wide angle. However, as one would step back from the viewer, the angle of view would decrease thereby reducing the effectiveness of the viewer.

The previous furnace or burner observation devices have required the use of either a camera obscura to project the image of the furnace interior onto a round glass, a passageway with or without a glass window, or a glass window alone. These devices must be permanently installed. Usually, a glass window is the observation device in a steam generator burner for viewing the burner's flames. However, when combustion problems are encountered, one cannot usually diagnose the cause of the problems by simply viewing the flames through such a narrowly-limited field of view as provided by these devices. But by strategically positioning the Wide Angle Optical Viewer inside a burner or furnace, one can see the whole interior of the burner or furnace, allowing precise diagnosis of combustion problems. Additionally, because the Wide Angle Optical Viewer may be portable, it may be used at numerous burner or furnace observation ports.

Previously, when a simple passageway has been used in observation, persons viewing the interior have been subjected to hot combustion gases which hinder direct observation. Even with the addition of a glass window in conjunction with the passageway, the viewing of the furnace interior has been substantially hampered. There has been a need to use a passageway of such a length as to place the glass viewing surface at a sufficient distance from the furnace interior to reduce the heat encountered by the observer. This distance has greatly restricted the angle of view to the interior.

Finally, use of the camera obscura presents difficulties in that it is not portable, but instead is permanently installed, thus requiring a separate unit for each observation port. In addition, the camarea obscura requires the addition of a cumbersome light-proof chamber and viewing screen, which need cooling from air and/or water. However, each Wide Angle Optical Viewer can be portable and usable in several observation ports. Also, with the Wide Angle Optical Viewer there is no need for a light-free chamber, viewing screen, or air and water cooling attachments because it affords the observer a wide angle view regardless of the viewer's distance from the wide angle lens apparatus, and its planar, heat resistant lenses protect the inner lenses (and the observer) from high temperature gradients (thermal shock) and reflect most of the radiant heat emitted from the combustion process, thereby reducing heat transmission and allowing the interior lenses to remain relatively cool. Furthermore, the observer is protected from blow-back of shattered glass should the inner lenses break.

The related art comprises:

U.S. Pat. No. 1,896,830—Scharff, which is directed to an optical system for maintaining even illumination from a distanced, moving ray transmitter.

U.S. Pat. No. 2,312,542—Goodman, which is directed to a peep-hole device for doors. A negative, double-convex lens is positioned closest to the side of the door to be viewed, and as a positive, double-convex lens of the same diameter is towards the inside of the door.

U.S. Pat. No. 2,491,758—Nichols et al., which is directed to a peep hole for doors. The eyepiece is in the form of a single convex lens, while a double concave or object lens is mounted in the front end of the cylindrical member encasing the lenses.

U.S. Pat. No. 2,603,128—Miles, which is directed to an optical system from a distortion-corrected visual field of 85° or more for use in objectives and eyepieces. The system comprises three lenses, a first lens being a meniscus, and two opposing plano-convex lenses.

U.S. Pat. No. 3,439,971—van Vliet, Jr., which is directed to a wide angle viewing device comprising two subsystems each consisting of a pair of objective lenses and a field lens. The two subsystems are positioned in tandem within a rectangular housing having highly reflective inner surfaces.

U.S. Pat. No. 3,472,577—Rosin et al., which is directed to a wide angle long eye-relief eyepiece. The eyepiece lens may be a plano-convex or double convex lens with aspheric correction incorporated into the convex surfaces(s). A triple lens composed of a convex lens in surface-to surface contact with a plano-convex lens is spaced from the objective lens.

U.S. Pat. No. 3,490,421—Pincus, which is directed to an optical observation port which utilizes the principles of a camera obscura to project a relatively wide angle image of a furnace interior on ground glass. A double convex lens positioned in the wall of the furnace provides an image on a glass viewing screen. The angle of view of approximately 60° is increased by pivoting the lens in a support bracket.

U.S. Pat. No. 3,514,186—Poncelet, which is directed to a wide angle optical device comprising as refracting elements a sphere together with a converging lens element arranged in extremely close proximity to the sphere and having a diameter larger than the sphere. This second, positive element can be a pair of spaced plano-convex lenses arranged symmetrically with their convex surfaces facing each other.

U.S. Pat. No. 4,251,127—Yamaguchi, which is directed to a wide angle door viewer which can be zoomed and is readily perceptible without closely approaching the eyepiece. The viewer comprises an optical lens barrel having relatively large diameter lenses in positions of reverse Galileo system and a relatively larger diameter eyepiece on which the large view is provided for direct by distanced observation.

SUMMARY OF THE INVENTION

A five-lens grouping that both permits one to see the same wide-angle view regardless of the observer's distance from the viewing device and is able to withstand high temperatures. The device is especially designed for use in high temperature applications.

BRIEF DESCRIPTION OF THE DRAWINGS

FIG. 1 shows the external appearance of the WIDE ANGLE VIEWER.

FIG. 2 shows an end view of the wide angle viewer as seen from the rear end as depicted in FIG. 1.

FIG. 3 is a cross-sectional view showing the detailed construction of the wide angle lens apparatus.

FIG. 4 shows the present invention attached to a pipe and inserted into the interior of a furnace or vessel.

DESCRIPTION OF THE PREFERRED EMBODIMENT(S)

The preferred embodiments are (a) the combination of the wide angle viewer of the present invention affixed to the end of a pipe or tube 24 of sufficient length to reach to the interior of a vessel such as a furnace or burner F, (b) the wide angle viewer of the present invention inserted into the viewport of a furnace or burner F, or (c) the combination of the burner F engaged with the said combination of the wide angle viewer of the present invention affixed to the end of a pipe or tube 24 of sufficient length to reach to the interior of a vessel such as a furnace or burner F.

As shown in the diagram of FIG. 3, the basic components of the system comprise a bi-convex optical lens 10, which widens the angle of view seen through lenses 12 and 14, and also enlarges the image. To preserve the desired angle of view A, as shown in FIG. 4, from any distance D away from the viewing end 20b of the viewer it is critical that the diameter of lens 10 be larger than that of lenses 12 and 14. This lens 10 is preferably constructed of pyrex or quartz as the temperature environment dictates.

Lenses 12 and 14 are plano-convex optical lenses. More nearly situated to the viewed object than lens 10, these said lenses are substantially identical to one another, arranged spaced apart with their respective convex surfaces toward each other to minimize spherical abberations while providing a wide angle view at any distance away. The flat side of lens 14 is perpendicular to axis S and faces in the direction of front end 20f which points in the direction to be viewed. These lenses may be desirably constructed of pyrex or quartz as the temperature environment dictates. Lenses 12 and 14 are optically and axially aligned along axis or direction S.

Lenses 10, 12 and 14 provide a three-lens system with all three lenses optically aligned along axis S. Lens 10 is oriented toward viewing end 20b and the flat face of lens 14 is oriented toward the front end 20f. Lens 16 is preferably an optically flat or plano pyrex glass lens. Located further behind the viewed object than lens 10, the purpose of this lens is to protect the viewer from blowback of shattered glass and hot gases in the unlikely event that the inner lenses break.

Lens 18 is an optically flat pyrex infrared reflecting lens used to protect the inner lenses from high temperature gradients (thermal shock) when the present invention is placed within a high temperature environment such as a furnace or burner. Situated most immediately near the viewed object at front end 20f, this lens 18 reflects most of the radiant heat emitted from the combustion process, thereby reducing the heat transmission into and through the interior I of the viewer V and allowing the interior lenses 10, 12 and 14 to remain relatively cool.

The lenses 10 through 18 are inserted and mounted in the interior bore I of a cylindrical lens housing means 20, preferably of stainless steel or some other material able to withstand high temperatures. Said cylindrical lens housing means 20 has a step-wise varying diameter bore. Lenses 18, 12 and 14 are located in the lesser diameter bore portion 20s of said cylindrical lens housing means 20, and lenses 10 and 16 are located in the larger diameter bore portion 201 of said cylindrical lens housing means 20. Lenses 10, 12, and 14 are mounted in series at the desired precise distances from one another in order to provide the optimum image clarity and angle of view A. Said cylindrical lens housing means 20 may be constructed of any material capable of withstanding high temperature environments. A retaining ring or washer 22, preferably of stainless steel or some other material able to withstand high temperatures, having threads 22t and an interior bore 22b of sufficient dimension for full viewing through said larger diameter bore portion 201, is threaded into a threaded end 20t of housing 20, where the lenses are inserted, to further retain the lenses in their desired configuration. Said cylindrical lens housing means 20 has a knurled exterior surface to provide for grasping when the present invention is threaded onto a pipe.

As shown in FIG. 4, a pipe or tube 24 of sufficient length to reach to the interior of a vessel, such as a furnace or burner F is optionally affixed to the viewing end 20b of housing 20. The observer O looks from a distance D2 into the rear end 24r of the pipe or tube 24 through bore 24b to view the interior, while the other end 24f of said pipe or tube 24 is removably affixed to said end 20b of the housing 20 such as by complimentary threads. Distance D2 may be any desired distance without affecting the angle of view A through the viewer V. Bore 24b is axially aligned with the three-lens system of lenses 10, 12, and 14 to permit the observer O to view through the lenses. The combination of the present invention V and pipe 24 is then inserted into the interior 26 of a vessel such as a furnace or burner F for wide angle viewing of the interior 26 of the furnace or burner F through an opening or viewport VP in the wall 28 of the vessel F. Optionally, the said combination of the present invention V and pipe 24 may be mated or engaged with the viewport VP mounted on the furnace or burner F, providing a combination of a vessel having the wide angle viewer of the present invention.

The observer O may alternatively comprise an image recording means, which may be either photographic equipment or the human eye. Observer O is positioned in such an adjacent location as to record the image from the present invention V through the three-lens system of lenses 10, 12, and 14.

The combination of the present invention V and pipe 24 may be used in conjunction with a furnace or burner F whether there is a viewport VP or simply an access door in the furnace or burner F which is large enough for the said combination to enter the interior for viewing. The purpose of the present invention in viewing a furnace, for example, is to diagnose combustion problems that are ordinarily only visible to plant operators through a furnace door. The evaluations of these combustion problems is inconsistent due to the subjective and qualitative nature of the plant operators, whose view is very limited from the access door. By inserting the said combination into the interior 26 of the furnace, based on the known geometry of the furnace and viewer, precise combustion quality and flame lengths are determined. Since the precise combustion characteristics are revealed with the said combination, appropriate combustion modifications may be implemented to eliminate the abnormalities.

Another application of the present invention is in evaluation of burner operation. In a typical burner viewport, the operators looking through the port can only tell if there are flames in the furnace, but cannot see the burner assembly. When combustion problems occur, the operators cannot identify the cause. But, for example, with the combination of present invention V and pipe 24 mated or engaged with the viewport VP mounted on the furnace or burner F, one is able to see the entire burner assembly and readily identify the internal problem.

The foregoing disclosure and description of the invention are illustrative and explanatory thereof, and various changes in the size, shape and materials, as well as in the details of the illustrated construction may be made without departing from the spirit of the invention.

We claim:

1. Wide angle lens apparatus comprising:
two substantially identical plano-convex optical lenses, positioned with convex surfaces facing each other;
a bi-convex optical lens having a diameter which is larger than the diameter of the preceding two lenses, wherein the said bi-convex optical lens and the said plano-convex optical lenses comprise an axially aligned three-lens system; two planar, heat resistant lenses, axially aligned with and encasing said three-lens system between the two planar lenses, a cylindrical lens housing means having an interior bore for holding the lenses in a spaced apart series, wherein said lenses are inserted into said interior bore of the housing, and said housing means maintains the lenses in a desired axial alignment, and a tube of sufficient length to reach to the interior of a furnace or burner, having one end affixed to a viewing end of the housing, whereby an observer looks into an end of the tube to view the interior of a vessel, while the end of said tube affixed to said wide angle lens apparatus is inserted into the interior of a vessel, and said lenses are mounted at precise distances from one another in order to provide the optimum image clarity and angle of view, and further, said apparatus affords the observer a wide angle view regardless of the observer's distance from the wide angle lens apparatus, and said planar, heat resistant lenses both protect the inner lenses and protect the viewer from blow-back of shattered glass should the inner lenses break.

2. An improved vessel viewer of the type containing a biconvex or double convex lens positioned to permit a viewer to view into a heated interior of a vessel, the improvement comprising:
two substantially identical plano-convex lenses, axially aligned with said bi-convex optical lens and positioned with convex surfaces facing each other, said bi-convex optical lens having a diameter which is larger than the diameter of said plano-convex lenses, and said bi-convex lens and said plano-convex lenses comprising an axially aligned three-lens system; two planar, heet resistant lenses, axially aligned with and encasing said three-lens system between the two planar lenses, a cylindrical lens housing means having an interior bore for holding the lenses in a spaced apart series, wherein said lenses are inserted into said interior bore of the housing, and said housing means maintains the lenses in a desired axial alignment, and said lenses are mounted at a desired distance from one another to provide the optimum image clarity and angle of view, and a tube of sufficient length to reach to the interior of a furnace or burner, having one end affixed to a viewing end of the housing, whereby said viewer looks into an end of the tube to view the interior of the furnace, while the end of said tube affixed to said wide angle lens apparatus is inserted into the interior of a furnace or burner, and further, said appartus affords the viewer a wide angle view regardless of the viewer's distance from the viewing device.

3. A vessel and wide angle viewer combination comprising:
a vessel having a wall and interior space wherein said wall has at least one viewport having an opening into said interior space,
a lens housing for mounting lenses, penetrating the opening of said viewport and extending into the burner interior;
two substantially identical plano-convex lenses, positioned with convex surfaces facing each other, axially aligned with a bi-convex lens having a diameter which is larger than the diameter of the preceding two lenses to form a three-lens system, encased by two planar, heat-resistant lenses axially aligned with said three-lens system; a lens retainer means for retaining the lens in the desired alignment, and a pipe or tube of sufficient length to extend the wide angle viewer further into the interior of the vessel, affixed to the lens housing, whereby an observer looks into a viewing end of the pipe or tube to view the interior, while the other end of said pipe or tube affixed to said wide angle lens apparatus is inserted into the interior of said vessel, and further, said combination affords the observer a wide angle view of the interior of the burner regardless of the observer's distance from said viewport.

4. A vessel and wide angle viewer combination as recited in claim 3, wherein said vessel is a burner or furnace.

* * * * *